May 30, 1950  R. MATHEISEL  2,509,442
INVERSE ROTOR
Filed April 17, 1945  2 Sheets-Sheet 1

INVENTOR.
RUDOLPH MATHEISEL
BY
*Irving Seidman*
ATTORNEY

May 30, 1950
R. MATHEISEL
2,509,442
INVERSE ROTOR
Filed April 17, 1945
2 Sheets-Sheet 2
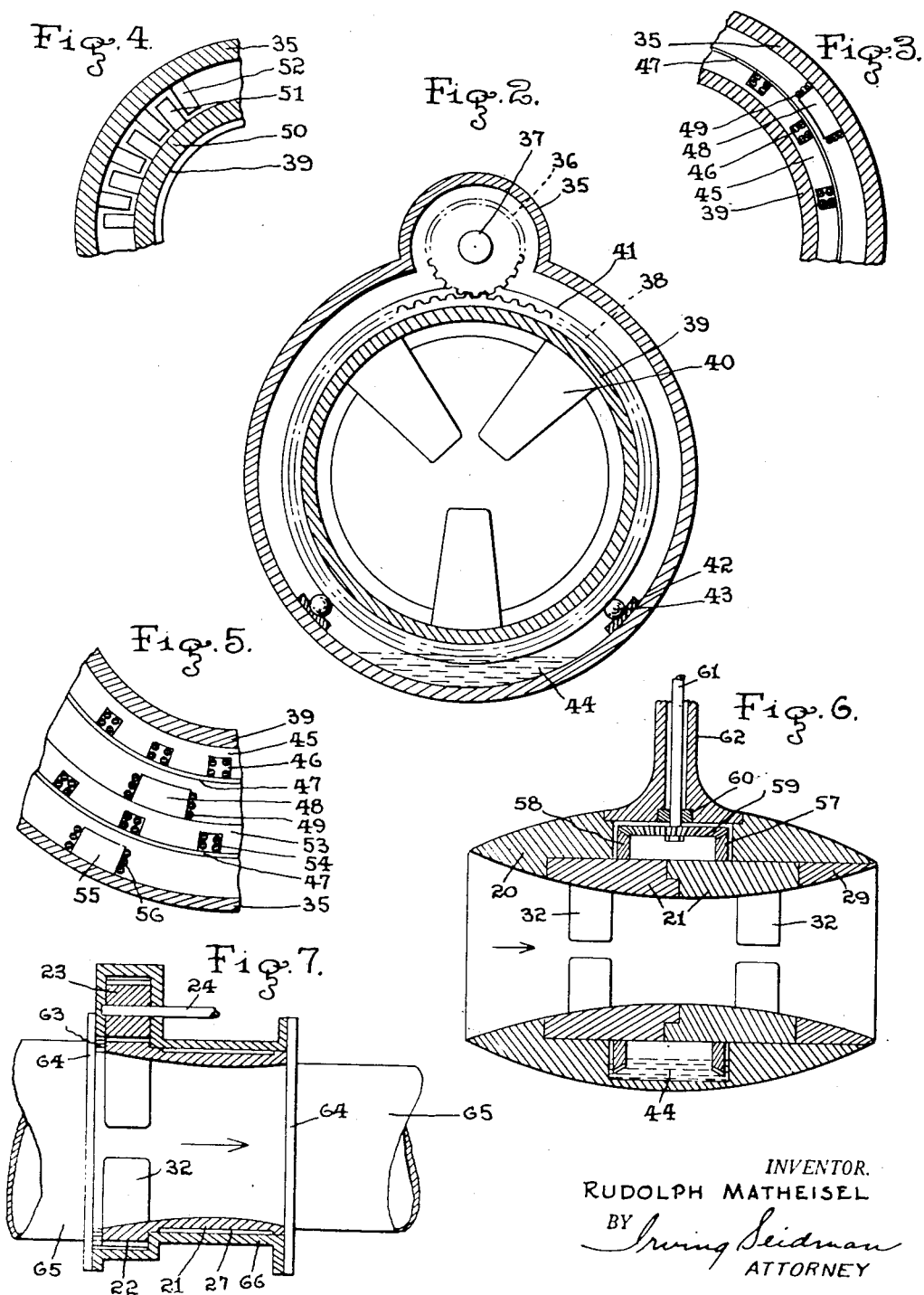
INVENTOR.
RUDOLPH MATHEISEL
BY Irving Seidman
ATTORNEY

UNITED STATES PATENT OFFICE 2,509,442

INVERSE ROTOR

Rudolph Matheisel, Northfield, N. H.

Application April 17, 1945, Serial No. 588,869

6 Claims. (Cl. 103—89)

This invention relates to improvements in rotors.

Heretofore conventional propellers used for marine and aeronautical propulsion and in fluid current motors, compressors, pumps and turbines do not produce the best possible thrust by the reaction of the slipstream to the propellers so that minimum entrance, slipstream, rotational and viscosity losses are obtained. The best possible thrust and the least loss can be achieved when the thrust and the losses are distributed uniformly over the slipstream section in the rotor which is comprised of a special housing and a rotatable member with various cut acting parts which will hereinafter be described.

The object of my invention is to obtain greater efficiency and the best possible thrust, by eliminating the hub and root sections of the blades and the inherent losses occasioned, by the use of a light rotating device which is encased in a special housing. My structure lends itself better to, and improves the dynamic fluid flow conditions in propulsion, propelling fluids and fluid flow conversion to power and the like.

Another object is to reduce the losses of the dynamic fluid stream and the rotatable member which imparts energy to the stream causing contraction of the sectional area of the stream, or conversely, after the rotatable member abstracts energy from the stream, expansion is caused of the sectional area of the stream. By shaping the structure of the various parts for the dynamic fluid flow conditions is important since the area contraction or expansion losses are reduced to a minimum.

A further object of my invention is to decrease the rotational losses in order to rectify the helical path of the dynamic fluid mass after the rotor imparts or abstracts energy through the blades, at an angle to the general diametric fluid flow direction.

Rectification of the helical flow to axial flow reduces this loss which is found in all rotors, propellers and the like heretofore known.

Still a further object of my invention is to improve the dynamic fluid flow condition at the entrance to the rotor by shaping the structure and the rotatable member so that the "ram effect" due to the forward velocity improves the rotor's efficiency and also inhibits cavitation.

Still another object of my invention is to improve the dynamic flow condition at the entrance of the rotor by the use of guide vanes in order to obtain increased rotor efficiency.

Another object is to reduce the weight of the structure to a minimum and to increase the strength of the structure to a maximum by use of a shell and hoops shrunk thereon, wherein the compressive force of the hoop opposes the centrifugal force of the rotating members and permits a greater thrust loading on the blades thereby.

Another object is to eliminate and reduce the cost of expensive external reduction gears and thrust bearings and/or other means of rotation by consolidating these structures with said rotor, particularly where high speed power units are used or where power is derived from fluid currents.

Still another object of the invention is to combine motor and rotor, turbine and rotor or generator, motor and rotor, or the like with the required rolling and thrust bearings thereby eliminating the unnecessary structural members to obtain compact units.

Another object is to improve the centrifugal impeller.

Another object is to provide greater safety for the public in the use of the various adaptations of my rotor.

For a fuller understanding of the nature and objects of my invention, reference is had to the following detailed description in connection with the accompanying drawings. Preferred embodiments of my invention have been chosen for the purpose of illustration, in which:

Fig. 2 is an end sectional view of a geared rotor and guide and rectifying vanes eliminated in order not to complicate the drawings;

Fig. 3 is a partial end section showing a motor and rotor combination;

Fig. 4 is a partial end section showing turbine and rotor combination;

Fig. 5 is a partial end section of a generator, motor, and rotor combination in which the armature of the generator and the field of the motor as a single unit is gear driven;

Fig. 6 is a longitudinal section of geared contra-rotating rotors;

Fig. 7 is a longitudinal section of a modified form of my invention adapted for pumps and the like;

Figure 1:
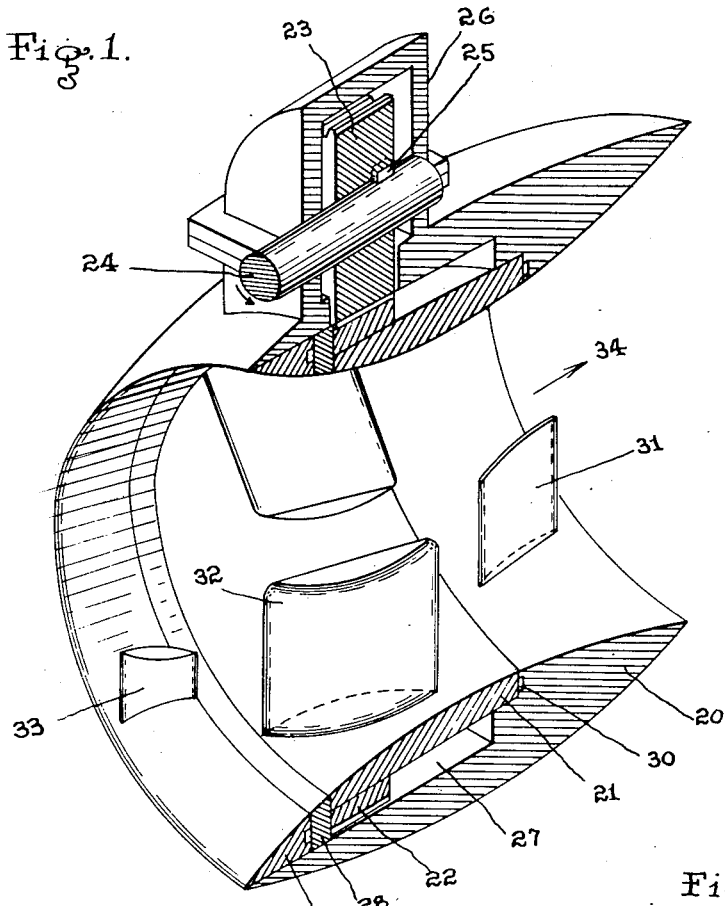
Fig. 1 is a longitudinal sectional view of the rotor shown in perspective.

Referring to the drawings, Fig. 1 illustrates a faired casing or housing 20 with the faired rotor or annular member 21 fitted therein so that a minimum internal open section area of my invention lies after the section through the median lines of the blades in the direction of flow 34 in order to decrease fluid area contraction losses. To the rotor 21, a shrink hoop and gear ring 22 is fastened which in turn is driven by pinion gear 23 which is located upon the shaft 24 by the key 25. These latter parts are enclosed by a cover 26 which forms part of the housing 20. The thrust and wearing ring 28 is attached to the rotor 21. The annular opening 27 may be used as an oil sump for the gear 22. Seals 30 make the chamber fluid tight. Guide vanes 33 are fixed upon the retaining ring 29 in order to induce the fluid to enter with minimum turbulence and at a predetermined angle to the blades 32. A multiplicity of such blades 32 which are attached or integral with rotor 21, impart energy to the fluid, the said fluid being entrained by the rotating blades tends to travel helically until the rectifying vanes 31 direct the fluid in a truly axial flow, in the direction as indicated by the arrow 34, in order to obtain a minimum loss because of the aforesaid helical travel.

My device may be attached to any vessel or vehicle, that is, a propulsion device in order to obtain greater efficiency or may be placed in a dynamic fluid current in order to abstract power from the stream.

Fig. 2 shows a modified structure in which the rotor shell 39 has the blades 40 attached thereto with hoops 41 shrunk thereon and ring gear 38 also attached to shell 39. Pinion gear 36 is keyed to shaft 37 which turns the rotating members through the ring gear 38. A ball or roller bearing device 42 recessed within retainer 43 bears upon corresponding circumferential recess in hoop 41.

Numeral 44 represents oil which maintains the requisite lubrication for gears 36 and 38. Since the outer housing will generally be immersed in the oil designated by 44, the oil sump is actually a self-contained heat exchanger, and the housing 35 also transfers the heat of the oil.

In Fig. 3, I have shown the rotor shell 39 with hoops on member 45, having insulated electrical conductors 46 axially fixed therein, and a non-magnetic waterproof covering, the whole forming a motor armature. To the housing 35, motor poles 48 with insulated conductors 49 formed thereon are attached thereto forming the field of the motor which drives the rotor. As the electrical apparatus shown in Fig. 3 may be used to power the rotor 39 in lieu of the pinion 37 and gear 38 shown in Fig. 2, the Fig. 3 is easily understood by anyone versed in the art.

In Fig. 4, I have shown a rotor shell 39 with special hoops shrunk on member 50 which is adapted for attaching turbine blades 51 thereon. Housing 35 is adapted for attaching stationary blades 52. As the turbine elements shown in Figure 4 may be used to power the rotor 39 in lieu of the pinion 37 and gear 38 shown in Figure 2, Figure 4 is easily understood by anyone versed in the art.

In Fig. 5, I have shown the rotor shell 39, with shrink-hoop 45, motor armature conductors 46, non-magnetic, waterproof covering 47, comprising one rotating member, this rotating member revolves in axial and radial bearing devices as shown in Figure 2. The shrink-hoops 45 with bearing recesses are located fore and aft of those hoops bearing the electrical conductors 46. These bearing devices comprise also corresponding recesses in the shell 53a and hoops 53 which comprises the second rotating member therewith keeping shell 39 and hoops 45, the first member, concentric with shell 53a and hoop 53.

On shell 53a are shrink-hoops 53, the central hoops have recesses to bear generator conductors 53. A plastic material 47 covers these hopes and conductors. On the inner surface of shell 53a are mounted the motor field poles 48, bearing field conductors 49. The hoops at the ends of the shell have bearing recesses to accommodate the bearing devices, the companion recesses for the bearing device are locked in the housing 35 therewith maintaining concentricity in rotation. Also at one end of the shell 53a is located a gear ring as shown in Figure 2. The gear ring is in mesh with a pinion powered by an external engine. Hence rotation of the generator armature conductors 54 creates electrical energy within the motor described above is powered in a manner as desired through external electrical controls not shown. The housing 35 has mounted thereon generator field poles 55 bearing field coils 56 to create the required field flux.

It is pointed out that the bearing devices are like those shown in Figure 2. Also that the intermediate rotable member, shell 53a and hoops 53, is gear driven in the manner as shown in iFgure 2. Hence Figure 5 is easily understood.

In Fig. 6, I have shown another modification of the invention embodying contra-rotating rotors 21 which are shaped so that the blades 32 lie between the minimum internal open section area of the device and the maximum section area at the entrance and the discharge nozzles. The housing 20 contains rotors 21. The retaining ring 29 is fastened to the housing 20. Beveled gears 57 and 58 turn in oil 44 by the gears 59 and the shaft 61, which turn in the bearing 60 within the strut 62.

In Fig. 7, I have shown another modification of my invention which is suitable for use in a conduit or pipe line. Housing 66 is fastened to the flanges 64 to pipes 65. The rotor 21 with ring gear 22 is turned through gear 23 powered by the shaft 24. The wearing ring 63 fastened to the rotor surface has a rolling and thrust bearing. The blades 32 are fastened to the rotor 21 between the entrance and the minimum internal open section area. The rotor 21 is relieved on its external surface to decrease friction and form an oil channel interconnected by passages in the rotor or in the housing 66, or interconnected externally by piping, to the cavity; such interconnection is not shown since it is believed the line along which the section of Fig. 7 is taken.

Figures 8, 9:
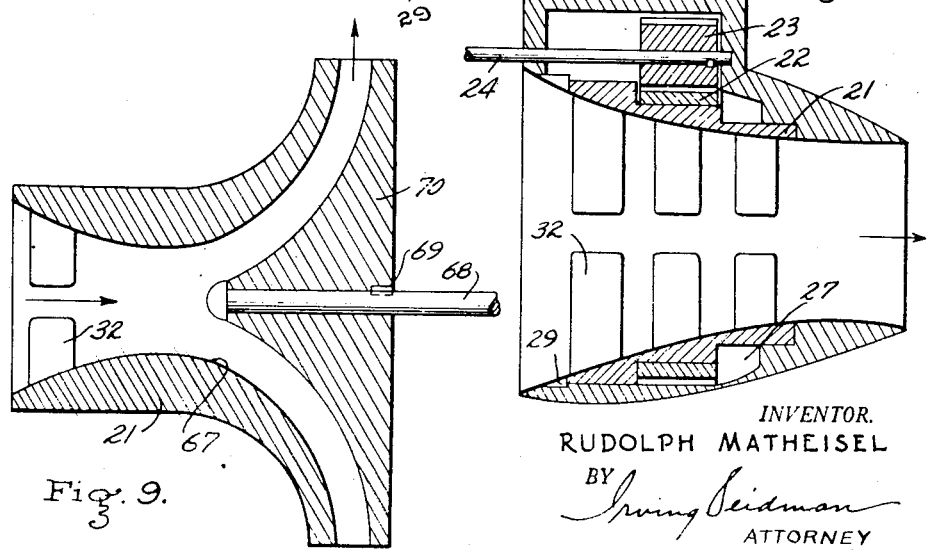
Fig. 8 is a longitudinal section of a pump impeller with my rotor added thereto within the eye of the impeller.
Fig. 9 is a longitudinal section of a modified form of the invention.

In Fig. 8, I have shown rotor 21 with a ring 22 and several blade sections 32 attached thereto between the entrance and the minimum internal open section area. Pinion gear 23 powered by the shaft 24 meshes with the ring gear 22 on the rotor 21. The retaining ring 29 is fastened to the housing. Cavity 27 is provided for a lubricant. The largest area and the minimum average pitch of the blades is found in the first element. The minimum area and the maximum pitch of the blades is found in the third element in the direction of the flow.

In Fig. 9, I have shown a centrifugal impeller 70 which is locked by the key 69 to the shaft 68. Fastened to the eye of the impeller 70 is the rotor 21 shaped so that the minimum internal open section area 67 is at the eye of the impeller after the element of the blades 32. The rotor increases the efficiency of the impeller and inhibits cavitation through the improved dynamic flow conditions induced by the shape of the rotor.

It is obvious that various changes and modifications may be made in the details of construction and arrangement of the various parts without departing from the general spirit of the invention as set forth in the appended claims, and I do not desire to limit myself to the exact construction and arrangements illustrated in the drawings and described herein.

I claim:

1. In a streamlined rotor member and housing for same of the character described comprising an annular rotor member rotatably fitted within said housing, a gear ring attached to said rotor member, a pinion gear mounted upon a shaft meshing with said gear ring, a key upon said shaft for fastening said pinion gear, a wearing ring attached to said rotor member, an annular opening between said housing and said rotor member for oil, a retaining ring, guide vanes mounted upon said retaining ring, blades angularly mounted upon said rotor member and rectifying vanes angularly mounted upon said housing.

2. In a streamlined rotor member and housing for same of the character described comprising an annular rotor member rotatably fitted within said housing, a gear ring attached to said rotor member, a pinion gear mounted upon a shaft meshing with said gear ring, a key upon said shaft for fastening said pinion gear, a cover for said pinion gear, a wearing ring attached to said rotor member, an annular opening between said housing and said rotor member for oil, a channel in said housing, an annular seal within said channel for making said annular opening fluid tight, a retaining ring, guide vanes mounted upon said retaining ring, blades angularly mounted upon said rotor member and rectifying vanes angularly mounted upon said housing.

3. In a streamlined rotor member and housing for same of the character described comprising an annular rotor member rotatably fitted within said housing, the surfaces of said housing flared to carry out the streamlined curvature of said rotor member, the inner surface of said rotor member flared to continue the internal flare of said streamlined housing, a gear ring attached to said rotor member, a pinion gear mounted upon a shaft meshing with said gear ring, a key upon said shaft for fastening said pinion gear, an annular opening between said housing and said rotor member for oil, a retaining ring, guide vanes mounted upon said retaining ring, blades angularly mounted upon said rotor member, rectifying vanes angularly mounted upon said housing, the ends of said housing and retaining ring flared with sections of smaller diametrical area between the ends of said housing.

4. In a streamlined rotor member and housing for same of the character described comprising an annular rotor member rotatably fitted within said housing having flared opposed ends and a convex inner surface of smaller diametrical area between said opposed ends, a gear ring attached to said rotor member, a pinion gear mounted upon a shaft meshing with said gear ring, a key upon said shaft for fastening said pinion gear, blades angularly mounted upon said rotor member, an annular opening between said housing and said rotor member for oil, a channel in said housing, an annular seal within said channel for making said annular opening fluid tight, blades angularly mounted upon said rotor member, rectifying vanes angularly mounted upon said housing and guide vanes mounted upon said retaining ring.

5. In a streamlined rotor member and housing for same of the character described comprising an annular rotor member rotatably fitted within said housing, said rotor member retained within said housing, said housing having an inlet and an outlet, a gear ring attached to said rotor member, a pinion gear mounted upon a shaft meshing with said gear ring, a key upon said shaft for fastening said pinion gear, a wearing ring attached to said rotor member, an annular opening between said housing and said rotor member for oil, a channel in said housing, an annular seal within said channel for making said annular opening fluid tight and a retaining ring, guide vanes mounted upon said retaining ring, blades angularly mounted upon said rotor member, rectifying vanes angularly mounted upon said housing, said housing and rotor member having an air-foil type curvature longitudinally and internally.

6. In a streamlined rotor member and housing for same of the character described comprising an annular rotor member rotatably fitted within said housing, said rotor member retained within said housing, said housing having an inlet and an outlet, a gear ring attached to said rotor member with a curvilinear inner surface, said housing and rotor member having an air-foil type curvature longitudinally and internally, a pinion gear mounted upon a shaft meshing with said gear ring, a key upon said shaft for fastening said pinion gear, a wearing ring attached to said rotor member, an annular opening between said housing and said rotor member for oil, a channel in said housing, an annular seal within said channel for making said annular opening fluid tight, a retaining ring, guide vanes mounted upon said retaining ring, blades angularly mounted upon said rotor member, rectifying vanes angularly mounted upon said housing, the ends of said housing and retaining ring flared with sections of smaller diametrical area between the ends of said housing and a convex inner surface of smaller diametrical area between the opposed ends of said housing.

RUDOLPH MATHEISEL.

REFERENCES CITED

The following references are of record in the file of this patent:

UNITED STATES PATENTS

| Number | Name | Date |
|---|---|---|
| 649,065 | Martens | May 8, 1900 |
| 1,066,635 | Macdonald | July 8, 1913 |
| 1,071,042 | Fuller | Aug. 26, 1913 |
| 1,150,408 | Wilson | Aug. 17, 1915 |
| 1,519,664 | Campbell | Dec. 16, 1924 |
| 1,567,700 | Bongiovanni | Dec. 29, 1925 |
| 2,195,902 | Pezzillo | Apr. 2, 1940 |

FOREIGN PATENTS

| Number | Country | Date |
|---|---|---|
| 210,273 | Great Britain | Jan. 31, 1924 |
| 250,177 | Great Britain | July 8, 1926 |